(12) United States Patent
Evans et al.

(10) Patent No.: US 10,221,704 B2
(45) Date of Patent: Mar. 5, 2019

(54) METHOD OF APPLYING AN ELECTROPLATED LAYER TO A POLYMERIC COMPOSITE MATERIAL

(71) Applicant: ROLLS-ROYCE plc, London (GB)

(72) Inventors: Rhys Evans, Pontypridd (GB); Stuart Benjamin O'Brien, Derby (GB); Simon Donovan, Carmarthen (GB); Matthew Keeves, Anglesey (GB)

(73) Assignee: ROLLS-ROYCE PLC, London (GB)

( * ) Notice: Subject to any disclaimer, the term of this patent is extended or adjusted under 35 U.S.C. 154(b) by 105 days.

(21) Appl. No.: 15/366,847

(22) Filed: Dec. 1, 2016

(65) Prior Publication Data

US 2017/0167278 A1    Jun. 15, 2017

(30) Foreign Application Priority Data

Dec. 9, 2015  (GB) .................................. 1521650.0

(51) Int. Cl.
    *F01D 5/28*      (2006.01)
    *C25D 5/02*      (2006.01)
    (Continued)

(52) U.S. Cl.
    CPC ............... *F01D 5/288* (2013.01); *B32B 5/08* (2013.01); *B32B 15/08* (2013.01); *B32B 15/14* (2013.01); *C25D 5/02* (2013.01); *C25D 5/56* (2013.01); *C25D 7/00* (2013.01); *F01D 5/147* (2013.01); *F01D 5/282* (2013.01); *B32B 2262/12* (2013.01); *B32B 2307/202* (2013.01);
    (Continued)

(58) Field of Classification Search
    None
    See application file for complete search history.

(56) References Cited

U.S. PATENT DOCUMENTS

| 3,762,835 A | 10/1973 | Carlson et al. |
| 6,521,331 B1 | 2/2003 | Sikorski et al. |
| 2005/0029009 A1* | 2/2005 | Swift .................... B29C 70/882 174/255 |

FOREIGN PATENT DOCUMENTS

| EP | 1505696 A2 | 2/2005 |
| JP | H01-132794 A | 5/1989 |

(Continued)

OTHER PUBLICATIONS

May 12, 2017 Search Report Issued in European Patent Application No. 16201751.

(Continued)

*Primary Examiner* — Jeffrey D Washville
(74) *Attorney, Agent, or Firm* — Oliff PLC

(57) ABSTRACT

A method of applying an electroplated layer to a surface of a polymeric composite material, the method includes the steps of: providing an uncured polymeric composite substrate; positioning a veil layer over a surface of the uncured polymeric composite substrate, the veil layer providing a conductive surface on the uncured polymeric composite substrate, the veil layer having a mat of metal coated fibres consolidated by an organic binder material; subjecting the uncured polymeric composite substrate to a curing cycle to form a cured polymeric composite material in which the veil layer is partially exposed; and applying an electroplated layer to the conductive surface of the cured polymeric composite material.

15 Claims, 2 Drawing Sheets

(51) Int. Cl.
    *B32B 15/14*    (2006.01)
    *C25D 7/00*     (2006.01)
    *B32B 5/08*     (2006.01)
    *B32B 15/08*    (2006.01)
    *C25D 5/56*     (2006.01)
    *F01D 5/14*     (2006.01)

(52) U.S. Cl.
    CPC .... *F05D 2220/32* (2013.01); *F05D 2230/314* (2013.01); *F05D 2300/603* (2013.01)

(56) References Cited

FOREIGN PATENT DOCUMENTS

| | | |
|---|---|---|
| WO | 2015/032654 A1 | 3/2015 |
| WO | 2015/049114 A1 | 4/2015 |

OTHER PUBLICATIONS

Jun. 13, 2016 Search Report issued in British Application No. 1521650.0.

\* cited by examiner

METHOD OF APPLYING AN ELECTROPLATED LAYER TO A POLYMERIC COMPOSITE MATERIAL

This disclosure claims the benefit of UK Patent Application No. GB 1521650.0, filed on 9 Dec. 2015, which is hereby incorporated herein in its entirety.

FIELD OF THE DISCLOSURE

The present disclosure relates to a method for applying an electroplated layer to a surface and particularly, to a method for applying an electroplated layer to a surface of a polymeric composite material.

BACKGROUND TO THE DISCLOSURE

It is known to apply metallic coatings to the surface of composite materials for decorative purposes, for example decorative chrome coatings. Such coatings, typically electroplating directly onto the composite substrate, have low bond strength because they are applied by low cost processes.

There are alternative methods that can be used to provide metallic coatings to composite materials in which the coating has higher bond strength.

One such alternative is the use of vapour deposition techniques. While providing improved bond strength, these methods require high processing temperatures that can damage the composite substrate material.

A further such alternative the use of thermal spraying. Again, this technique can improve the coating bond strength but the abrasive grit blasting surface preparation can cause mechanical degradation of the composite material. These surface preparation requirements render thermal spraying techniques unusable on small or thin-walled components.

STATEMENTS OF DISCLOSURE

According to a first aspect of the present disclosure there is provided a method of applying an electroplated layer to a surface of a polymeric composite material, the method comprising the steps of:
providing an uncured polymeric composite substrate;
positioning a veil layer over a surface of the uncured polymeric composite substrate, the veil layer providing an electrically conductive surface on the uncured polymeric composite substrate, the veil layer comprising a mat of metal coated fibres consolidated by an organic binder material;
subjecting the uncured polymeric composite substrate to a curing cycle to form a cured polymeric composite material in which the veil layer is partially exposed; and
applying an electroplated layer to the partially exposed electrically conductive surface of the cured polymeric composite material.

The method of the disclosure uses the veil layer to alter the surface properties of the composite material in order to allow the application of a metallic coating (in the form of an electroplated layer) having a high bond strength without the need for aggressive surface preparation techniques.

By partially embedding the veil layer into the surface of the composite material, the metallic coating can be provided with a high bond strength. This enables the method of the disclosure to be used, for example, for the application of metallic coatings that in use are intended to be abraded or are intended to abrade an adjoining surface or component.

The use of an electrically conductive veil layer partially embedded in the surface of the composite material enables the metallic coating to be applied to the surface of the composite component by a conventional electro-plating technique. This makes the method of the disclosure simpler, easier to implement and more cost effective for a user.

Optionally, the step of subjecting the uncured polymeric composite substrate to a curing cycle to form a cured polymeric composite material, comprises the additional step of:
partially abrading the partially exposed electrically conductive surface of the cured polymeric composite material to further expose the veil layer.

The step of partially abrading the electrically conductive surface layer of the composite material may further improve the bond strength of the metallic coating. This enables the method of the disclosure to produce electroplated composite material components having improved coating bond strength so making the method more convenient for a user.

Optionally, the step of partially abrading the partially exposed electrically conductive surface of the cured polymeric composite material to further expose the veil layer comprises the step of:
partially abrading the partially exposed electrically conductive surface of the cured polymeric composite material to expose an area fraction of between 15% and 40% of the veil layer.

By exposing an area fraction of between approximately 15% and 40% of the veil layer, the method of the disclosure ensures that the veil layer remains securely attached to the composite substrate while providing for a high bond strength between the metallic coating and the composite substrate. This makes the method of the disclosure more attractive to a user.

Optionally, the polymeric composite material is a fibre-reinforced polymeric composite material.

The use of fibre reinforcement in the polymeric composite material forming the composite substrate improves the mechanical properties of the composite substrate.

This makes the method of the disclosure to be used to produce electroplated composite components that can be used in mechanically arduous applications.

Optionally, the metal coated fibres comprise fibres coated with a metal selected from the group comprising transition metals.

The use of a transition metal as a coating for the metal fibres in the veil layer improves the mechanical properties of the electroplated layer by improving the bond strength of the electroplated layer to the metal fibres of the veil layer.

Optionally, the metal coated fibres comprise fibres coated with nickel or a nickel alloy.

Using metal coated fibres coated with nickel or a nickel alloy in the veil layer improves the bond strength between the electroplated layer and the metal coated fibres of the veil layer.

Optionally, the fibres are formed from a material selected from the group comprising glass fibres and carbon fibres.

The use of glass fibres or carbon fibres in the polymeric matrix can improve the mechanical properties of the composite material.

The organic binder is used to consolidate the metal coated fibres while the veil layer is positioned over the surface of the uncured polymeric composite substrate. Once the cure process has taken the place the binder material is subsumed into the composite substrate material.

According to a second aspect of the present disclosure there is provided a polymeric composite material comprising a polymeric composite substrate, an electrically conductive veil layer partially embedded in one surface of the composite substrate, the veil layer comprising a mat of metal coated fibres consolidated by an organic binder material, and an electroplated surface layer applied to the partially exposed electrically conductive veil layer.

The composite material of the disclosure uses the veil layer to alter the surface properties of the composite material in order to allow the application of a metallic coating (in the form of an electroplated layer) having a high bond strength without the need for aggressive surface preparation techniques.

By partially embedding the veil layer into the surface of the composite material, the metallic coating can be provided with a high bond strength. This enables the application of metallic coatings that in use are intended to be abraded or are intended to abrade an adjoining surface or component.

The use of an electrically conductive veil layer partially embedded in the surface of the composite material enables the metallic coating to be applied to the surface of the composite component by a conventional electro-plating technique. This makes the composite material of the disclosure simple and easy to manufacture and hence more cost effective for a user.

Optionally, the polymeric composite material further comprises one or more fibre layers embedded within the polymeric substrate.

The use of fibre reinforcement in the polymeric composite material forming the composite substrate improves the mechanical properties of the composite substrate. This enables the composite material of the disclosure to be used to produce electroplated composite components that can be used in mechanically arduous applications.

Optionally, the metal coated fibres comprise fibres coated with a metal selected from the group comprising transition metals.

The use of a transition metal as a coating for the metal fibres in the veil layer improves the mechanical properties of the electroplated layer by improving the bond strength of the electroplated layer to the metal fibres of the veil layer.

Optionally, the metal coated fibres comprise fibres coated with nickel or a nickel alloy.

Using metal fibres coated with nickel or a nickel alloy in the veil layer improves the bond strength between the electroplated layer and the metal coated fibres of the veil layer.

to Optionally, the one or more fibre layers are formed from a material selected from the group comprising glass fibres and carbon fibres.

Using metal fibres coated with nickel or a nickel alloy in the veil layer improves the bond strength between the electroplated layer and the metal coated fibres of the veil layer.

The organic binder is used to consolidate the metal coated fibres while the veil layer is positioned over the surface of the uncured polymeric composite substrate. Once the cure process has taken the place the binder material is subsumed into the composite substrate material.

According to a third aspect of the present disclosure there is provided a fan blade for a turbofan engine, wherein the fan blade comprises the composite material according to the second aspect.

According to a fourth aspect of the present disclosure there is provided a gas turbine engine comprising a fan blade according to the third aspect.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
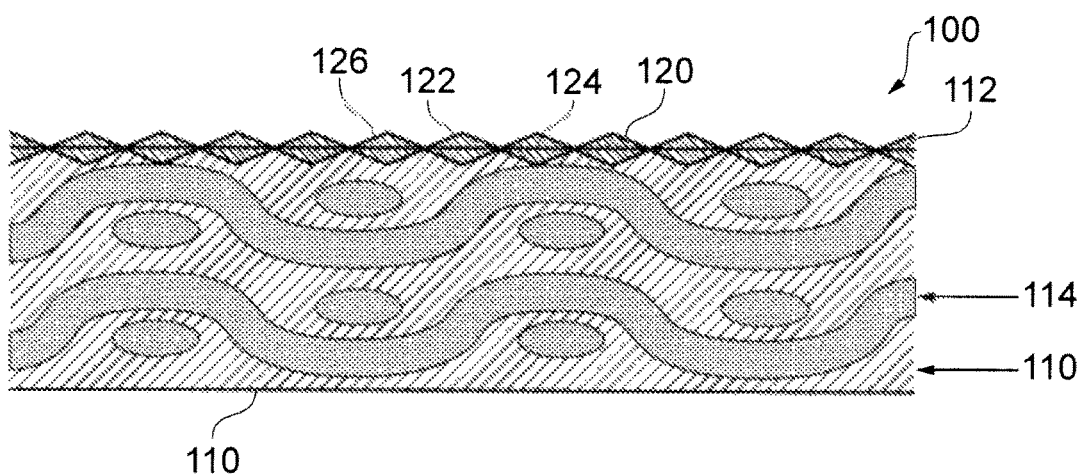
FIG. 1 shows a schematic sectional view of a polymeric composite material according to an embodiment of the disclosure, prior to the application of an electroplated layer.
Figure 2:
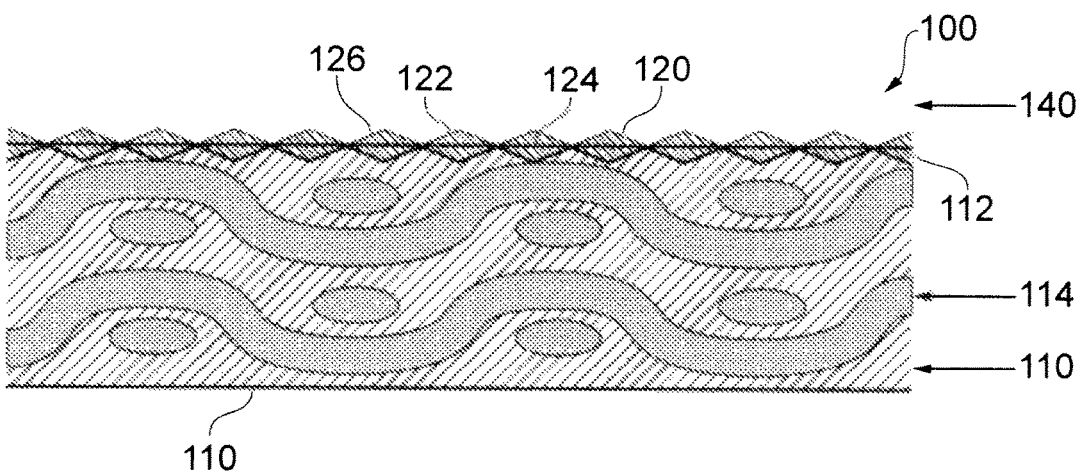
FIG. 2 shows a schematic sectional view of the polymeric composite material of FIG. 1 after the application of the electroplated layer.
Figure 3:
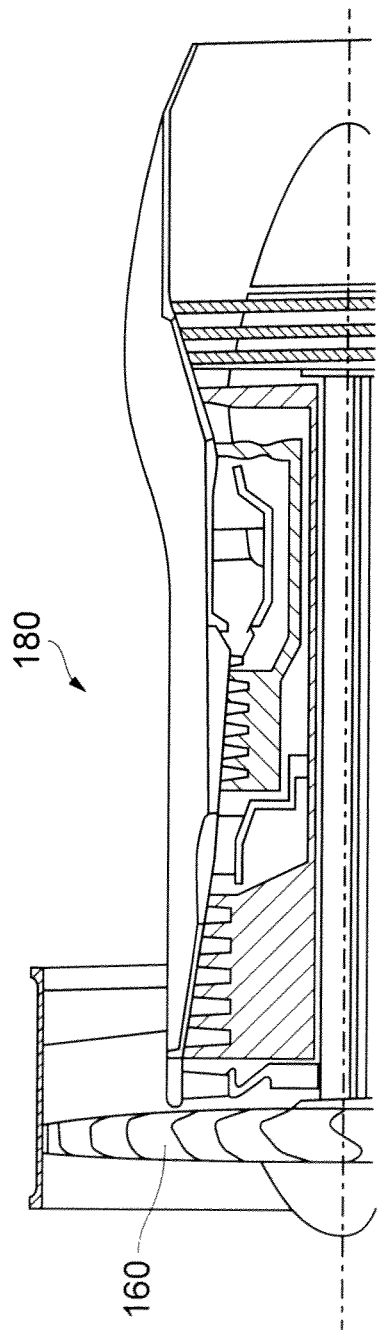
FIG. 3 shows a schematic sectional view of a turbofan engine comprising a fan blade formed using the polymeric composite material of FIGS. 1 and 2.

Referring to FIGS. 1 and 2, a polymeric composite material according to an embodiment of the disclosure is designated generally by the reference numeral 100.

The polymeric composite material 100 comprises a polymeric substrate 110, an electrically conductive veil layer 120, and an electroplated surface layer 140.

In the present embodiment, the polymeric substrate 110 comprises a number of carbon fibre reinforcement layers 114 embedded in the polymeric substrate 110. In other embodiments of the disclosure, the fibre reinforcement layers 114 may be formed from glass fibres or any other suitable reinforcing fibre.

The veil layer 120 is positioned over one surface 112 of the uncured polymeric substrate 110.

The electrically conductive veil layer 120 comprises a mat of metal-coated fibres 122 consolidated in an organic binder matrix 124.

In the embodiment shown in FIGS. 1 and 2, the veil layer 120 comprises a mat of nickel coated glass fibres 122 that have been consolidated in an organic binder matrix 124.

The polymeric substrate 110 together with the applied veil layer 120 are then subjected to a curing cycle to form a cured polymeric composite material 100 in which the veil layer 120 is partially exposed.

The partially exposed conductive surface 126 of the veil layer 120 may be partially abraded to further expose the electrically conductive veil layer 120. In the embodiment shown in FIGS. 1 and 2, the partially exposed conductive surface 126 of the veil layer 120 is abraded to expose an area fraction of 30% of the electrically conductive veil layer 120.

The electroplated surface layer 140 is then applied to the partially exposed electrically conductive veil layer 120. The electroplated surface layer 140 may be applied by any suitable electroplating technique (not described further herein).

Except where mutually exclusive, any of the features may be employed separately or in combination with any other features and the disclosure extends to and includes all combinations and sub-combinations of one or more features described herein.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person of skill in the art are included within the scope of the disclosure as defined by the accompanying claims.

What is claimed is:

1. A method of applying an electroplated layer to a surface of a polymeric composite material, the method comprising the steps of:
   providing an uncured polymeric composite substrate;
   positioning a veil layer over a surface of the uncured polymeric composite substrate, the veil layer providing an electrically conductive surface on the uncured polymeric composite substrate, the veil layer comprising a mat of metal coated fibers and an organic binder material;
   subjecting the uncured polymeric composite substrate to a curing cycle to form a cured polymeric composite material in which the veil layer is partially exposed; and
   applying an electroplated layer to the partially exposed veil layer of the cured polymeric composite material.

2. The method as claimed in claim 1, wherein the step of subjecting the uncured polymeric composite substrate to a curing cycle to form a cured polymeric composite material, comprises the additional step of:
   partially abrading the electrically conductive surface of the cured polymeric composite material to further expose the veil layer.

3. The method as claimed in claim 2, wherein the step of partially abrading the electrically conductive surface of the cured polymeric composite material to further expose the veil layer comprises the step of:
   partially abrading the electrically conductive surface of the cured polymeric composite material to expose an area fraction of between 15% and 40% of the veil layer.

4. The method as claimed in claim 1, wherein the polymeric composite material is a fiber-reinforced polymeric composite material.

5. The method as claimed in claim 1, wherein the metal coated fibers comprise fibers coated with a metal selected from the group consisting of transition metals.

6. The method as claimed in claim 5, wherein the metal coated fibers comprise fibers coated with nickel or a nickel alloy.

7. The method as claimed in claim 1, wherein the fibers are formed from a material selected from the group consisting of glass fibers and carbon fibers.

8. A polymeric composite material comprising a polymeric substrate, an electrically conductive veil layer partially exposed on one surface of the composite substrate, the veil layer comprising a mat of metal coated fibers and an organic binder material, and an electroplated surface layer applied to the partially exposed electrically conductive veil layer.

9. The composite material as claimed in claim 8, further comprising one or more fiber layers embedded within the polymeric substrate.

10. The composite material as claimed in claim 8, wherein the metal coated fibers comprise fibers coated with a metal selected from the group consisting of transition metals.

11. The composite material as claimed in claim 10, wherein the metal coated fibers comprise fibers coated with nickel or a nickel alloy.

12. The composite material as claimed in claim 9, wherein the one or more fiber layers are formed from a material selected from the group consisting of glass fibers and carbon fibers.

13. A fan blade for a turbofan engine, wherein the fan blade comprises the composite material as claimed in claim 8.

14. A gas turbine engine comprising a fan blade as claimed in claim 13.

15. The method as claimed in claim 1, wherein the veil layer provides an electrically conductive surface over an entirety of a region of the surface to which the veil layer is applied.

* * * * *